United States Patent
Goglio et al.

(10) Patent No.: US 6,468,332 B2
(45) Date of Patent: Oct. 22, 2002

(54) SELECTIVE DEGASSING VALVE FOR CONTAINERS OF AROMATIC OR ODOROUS PRODUCTS, SUCH AS COFFEE AND THE LIKE

(75) Inventors: Franco Goglio, Milan; Osvaldo Bosetti, Varese; Giorgio Bottini, Gallarate, all of (IT)

(73) Assignee: Goglio Liugi Milano S.p.A., Milan (IT)

(*) Notice: Subject to any disclaimer, the term of this patent is extended or adjusted under 35 U.S.C. 154(b) by 0 days.

(21) Appl. No.: 09/862,353

(22) Filed: May 22, 2001

(65) Prior Publication Data

US 2002/0066370 A1 Jun. 6, 2002

(30) Foreign Application Priority Data

Dec. 6, 2000 (IT) ...................................... MI20A002648

(51) Int. Cl.[7] .......................... B65D 51/16; B01D 46/00
(52) U.S. Cl. .............................. 96/134; 96/148; 55/311; 55/385.4; 220/372; 426/118
(58) Field of Search .............................. 96/4, 134, 148; 55/310, 311, 315, 318, 385.4, 524; 95/138, 139; 220/371, 372; 426/118, 395; 215/308

(56) References Cited

U.S. PATENT DOCUMENTS

| | | | | |
|---|---|---|---|---|
| 5,322,701 A | * | 6/1994 | Cullen et al. ............... | 252/190 |
| 5,515,994 A | * | 5/1996 | Goglio ....................... | 220/371 |
| 5,766,660 A | * | 6/1998 | Lee et al. .................... | 206/204 |
| 5,891,223 A | * | 4/1999 | Shaw et al. ................. | 55/385.4 |
| 5,988,414 A | * | 11/1999 | Schwarz et al. ............ | 215/261 |
| 6,056,439 A | * | 5/2000 | Graham ..................... | 220/89.1 |
| 6,095,356 A | * | 8/2000 | Rits ............................ | 215/261 |
| 6,217,639 B1 | * | 4/2001 | Jackson ..................... | 55/385.4 |

FOREIGN PATENT DOCUMENTS

EP 0 659 657 B1 7/1998

* cited by examiner

Primary Examiner—David A. Simmons
Assistant Examiner—Frank M. Lawrence
(74) Attorney, Agent, or Firm—Sheridan Ross PC

(57) ABSTRACT

A one-way degassing valve (4) for containers of aromatic products such as coffee and the like, comprising a valve body (5, 6), a valve element (12) and a filter (17), comprising a selective filter layer (21a), preferably consisting of activated charcoal, which allows the passage of low molecular weight gases, such as carbon dioxide, and retains high molecular weight gases that constitute the product's aroma, and an oxygen and $CO_2$ adsorbing layer (21b), able to eliminate the residual oxygen present in the container and suitably reduce the amount of $CO_2$.

20 Claims, 2 Drawing Sheets

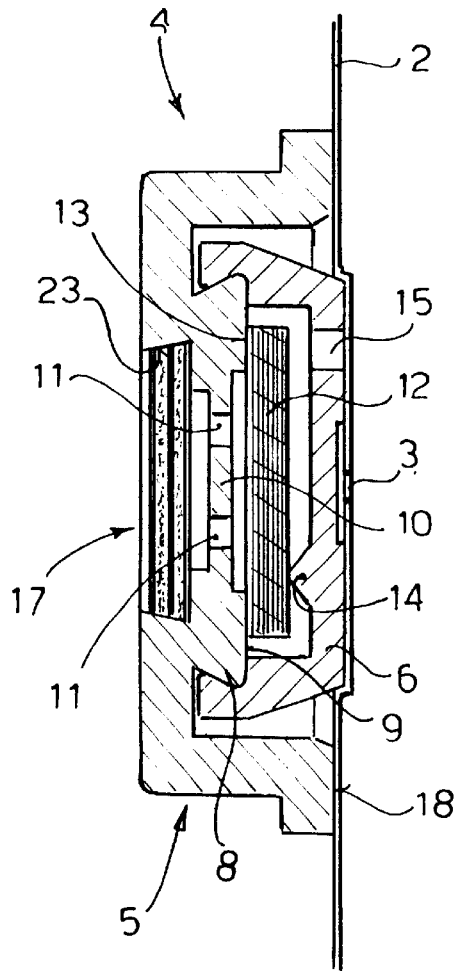
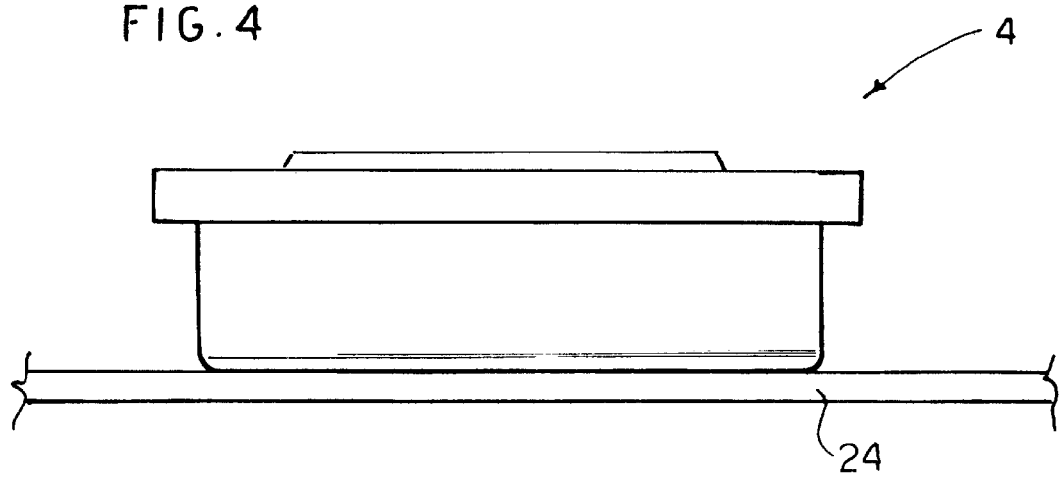

SELECTIVE DEGASSING VALVE FOR CONTAINERS OF AROMATIC OR ODOROUS PRODUCTS, SUCH AS COFFEE AND THE LIKE

FIELD OF THE INVENTION present invention relates to a valve for containers of aromatic or in any case odorous products, especially particulate or powder products, such as coffee, detergents, organic liquids and the like.

BACKGROUND OF THE INVENTION

Valves of the above-mentioned type are obviously already known and are commonly called degassing valves. They are one-way valves which are normally applied to the upper wall of the container and whose purpose is to allow the gases developed by the product, for example coffee, to escape from the container, avoiding the possible build-up of internal overpressure, which would cause bulging and/or tearing of the container itself, and at the same time to prevent air from entering the container as this would impair the quality of the product.

The one-way valves used at present serve this purpose perfectly, opening when slight internal overpressures occur and closing immediately when they cease.

However, these valves present great drawbacks due to the following considerations.

Fresh (newly packaged) coffee generates a mixture of gases inside the container, consisting mainly of carbon dioxide and, in a smaller percentage, of so-called aromas, which are characterized by complex molecular chains.

The one-way valves currently in use utilize porous filters, whose sole purpose is to prevent the escape of particles of coffee. In the event of overpressures inside the container, therefore, they allow both carbon dioxide and the product's aromas to escape, as well as other gases. Valves of this type are described, for example, in Italian patents 823800 and 971505.

Although specific reference is made in this description to coffee, that is to a product with a pleasant aroma, the same problem arises for odorous products in general, such as the detergents and organic liquids mentioned above, for which it would be desirable to avoid the escape of odours, in this case unpleasant ones.

EP-0 659 657 B1 describes a valve of the selective type which allows the gases that form in the package to escape, retaining the product's aromas. It has been noted, however, that such a type of valve does not allow the complete escape of the oxygen, which tends to oxidize the product with which it comes into contact, detracting from the quality thereof.

It is therefore necessary to close the container after having created a high vacuum by a procedure that tends to slow down the production rates of the packaging machines or else it is necessary to carry out washing with inert gas, again by means of quite a costly procedure.

The package has a slightly bulging appearance according to the overpressure necessary for opening the valve.

SUMMARY OF THE INVENTION

The object of the invention is to avoid said drawbacks, and to preserve the nature of the product more or less intact, reducing to a minimum or preventing the escape of aromas or odours, and at the same time ensuring that the oxygen present in the package is eliminated and the carbon dioxide is reduced so that the package does not appear to bulge.

This object is achieved, according to the invention, by providing a degassing valve equipped with a selective filter, which allows the passage of molecules of carbon dioxide and other gases, and traps the molecules that determine the product's aroma and odours, not allowing them to escape, and which eliminates the residual part of the oxygen, thus enhancing the quality of the product.

Coffee is known to develop a large amount of $CO_2$, equivalent to as much as two or three times its volume, after toasting. Most of this $CO_2$ is eliminated through the valve, whereas the residual amount is absorbed by the filter to such an extent as to further reduce the residual internal pressure inside the package, thereby giving the package a pleasant appearance without bulges.

Porous filters or molecular sieves can be used as selective filters. However, in the tests performed it has been observed that the filters that best perform this selector function are compounds based on activated charcoal, diatomaceous earth, silica, etc, which in any case can be modified by adding additives which make them specific to the individual organic requirements. The oxygen, on the other hand, is adsorbed through oxidoreduction reactions, reactions of addition to organic substances, as already known to the art. The same applies to $CO_2$.

Further characteristics of the invention will be made clearer by the detailed description that follows, referring to a purely exemplary and therefore non-limiting embodiment thereof, illustrated in the appended drawings, in which:

BRIEF DESCRIPTION OF THE DRAWINGS

FIG. 2 is a diagrammatic sectional view of the valve in FIG. 1, installed on a container, shown partially;

FIG. 4 is a diagrammatic side elevational view of a degassing valve according to the invention before installation on a container.

DESCRIPTION OF THE INVENTION

Figure 3:
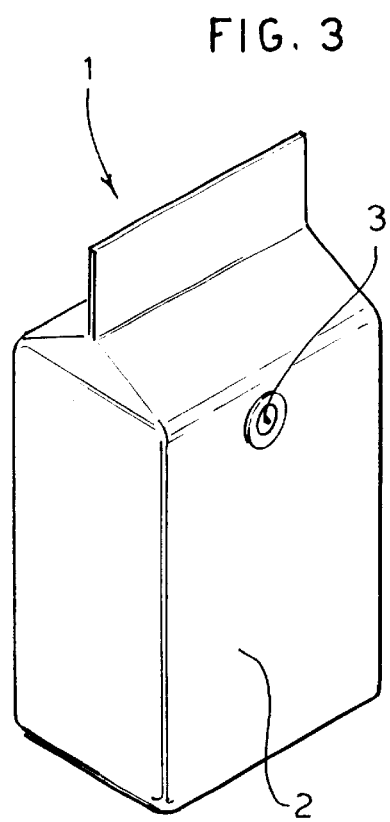
FIG. 3 is a diagrammatic axonometric view of a container equipped with such a valve.

With reference to these figures, in FIG. 3 reference numeral 1 designates in a general way a container for aromatic products, particularly coffee, of the flexible or semi-rigid type.

In the example illustrated, the selective valve according to the invention is installed on the front part of the container. For this purpose, a small hole 3 is made in the sheet material, or laminate, of the container, beneath which a degassing valve, designated as a whole by reference numeral 4, is applied, said valve being heat-welded or glued to the laminate 2.

The degassing valve 4, whose general structure can be considered substantially known, comprises a base plate 5 and a cap 6 seated therein. The cap 6 has near its lower edge an annular groove 7 which engages in a corresponding annular projection 8 provided on the bottom of the plate 5. Above the projection 8 is a flat annular wall 9, which surrounds a central disk 10 provided with holes 11.

Between the cap 6 and the plate 5 is interposed a rubber diaphragm 12 acting as the valve proper, the peripheral part of which rests on said flat annular wall 9 of the plate, which is spread with a viscous layer 13, in order to provide a better seal. The diaphragm 12 is pressed against the plate 5 by an opposing projection 14 provided in the upper wall of the cap 6, in which a bleed or vent hole 15 is also provided.

The bottom of the plate 5 is shaped so that underneath it, below the disk 10, a seating 16 is provided for a filter 17 that will be described in greater detail below.

The valve 4 is fixed to the sheet 2 by welding or gluing that follows an annular path 18 along the upper outside edge of the plate 5.

The valve works as follows.

Under normal conditions, the rubber diaphragm 12 is applied in abutment against the flat wall 9 of the plate 5 and, thanks to the presence of the viscous layer 13, creates a seal both against the escape of the gases contained inside the container 1, and against the entry of air from the outside.

In the event of overpressures inside the container 1, the diaphragm 12 lifts from the wall 9, allowing the gases to escape, passing through the holes 11, the space that is created between the diaphragm 12 and the wall 9, the hole 15 in cap 6 and the hole 3 formed in the laminate 2 into the outside environment. When normal conditions are restored, the diaphragm 12 comes down again, preventing air from entering the container by the opposite route to that previously described.

In order to prevent the coffee aromas from escaping when the gases are being discharged from the container, a selective type filter 17 is used, comprising a plurality of porous layers with interposed adsorbent layers.

Figure 1:
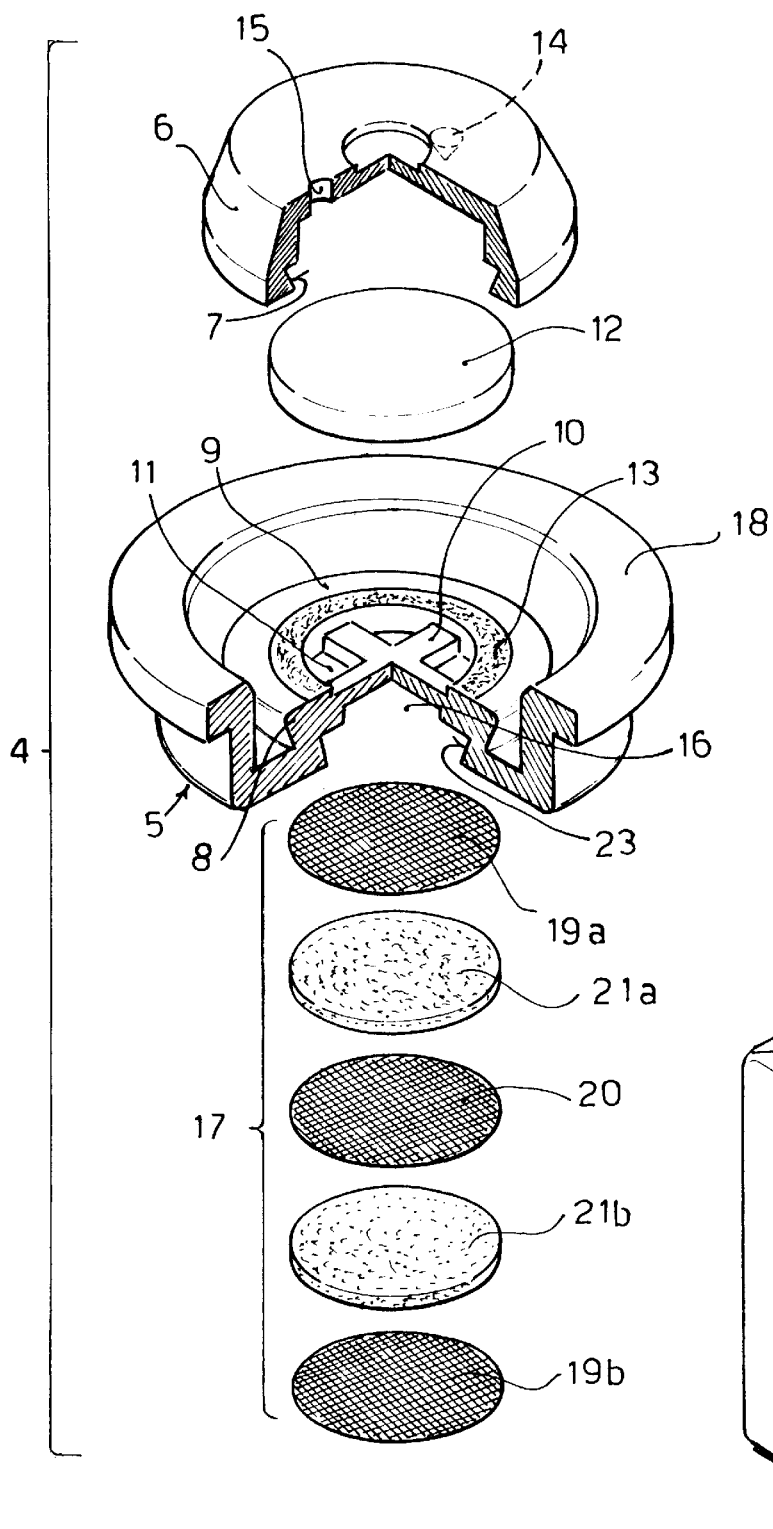
FIG. 1 is an exploded diagrammatic view of a degassing valve equipped with a selective, oxygen-adsorbing filter according to the invention.

In the preferred embodiment illustrated in FIG. 1, the filter 17 comprises an upper porous disk 19$a$, beneath which is disposed an adsorbent layer of activated charcoal 21$a$, a second porous disk 20, then an oxygen and $CO_2$ adsorbing layer 21$b$, consisting of materials containing ferrous ions, for example, and a third porous disk 19$b$. The whole can be retained in the seating both by simple pressure and by gluing or welding of a filtering wall.

The adsorbent layer 21$b$ is disposed more to the inside of the package, that is, nearer to the product, to improve the reduction of oxygen and $CO_2$ in the package.

According to an alternative embodiment, the two adsorbent layers 21$a$ and 21$b$ can be incorporated into a single layer comprising both activated charcoal and a substance that adsorbs oxygen and $CO_2$, thus eliminating one porous disk.

Another alternative consists in making two side-by-side chambers in the seating recess 16, said chambers separately containing the activated charcoal or the like and the oxygen and $CO_2$ adsorbent. In this case the chamber containing the oxygen adsorbent may even not be in communication with the upper area of the valve, since it has the sole function of adsorbing the oxygen and $CO_2$.

In order to preserve the activity of the adsorbents and in particular of the oxygen adsorbent, which would degrade rapidly upon contact with air, these are suitably protected before being installed on the package, for example by means of an underlying impermeable layer. This could consist of a multi-layer laminate composed, for example, of a peel-away polyester, aluminium and polyethylene film 24, as shown schematically in FIG. 4. In this case a ribbon or tape 24 would be obtained, on which the valves are welded and this would serve as a loader for the valves on the packaging lines. The ribbon of barrier film would be detached from the valve at the time of application to the desired point of the package.

Alternatively, the ribbon of barrier film can be punched onto the valve and remain welded thereto, to be perforated at the time of application of the valve to the package, thus preventing contact with the oxygen before the adsorbent begins to do its work.

With a filter thus structured, the gases given off by the coffee, before passing through the rubber diaphragm 12, are filtered through the activated charcoal 21$a$, which retains the majority of them, that is the aromas, thus maintaining a higher concentration inside the package. At the same time, the oxygen and $CO_2$ adsorbent 21$b$ eliminates the oxygen present in the package and maintains a suitable $CO_2$ content, eliminating the overpressure necessary to open the valve.

The role of the $CO_2$ adsorbent is thus to eliminate the overpressure present in the bag after the degassing procedure performed by the valve, in order to make the pressure inside and outside the package equal, eliminating bulging.

Application of the selective filter essentially acts as a barrier against the escape of volatile organic substances (aromas, fragrances, odours, etc.) from inside the container through degassing of the product. The filter component that removes the oxygen present in the package allows oxidization of the contents to be reduced, increasing the product's shelf life.

The system described above can find a use whenever it is necessary to allow gases to escape from the package, avoiding the passage of organic molecules and also reducing the oxygen and $CO_2$ content.

What is claimed is:

1. An airtight container for products that develop odorous gases, with a one-way degassing valve provided with at least one selective filtering layer which prevents aromas or odours from escaping, and at least one oxygen and carbon dioxide adsorbent layer able to eliminate the residual oxygen and carbon dioxide present in the container.

2. A degassing valve for containers of aromatic and odorous products, comprising a valve body and a mobile one-way valve element, positioned on the valve body and a filter engaging said valve body and positioned in front of the product, able to prevent the passage of particles of product, wherein said filter comprises a selective filtering layer which allows the passage of gas with simple molecules and retains gases with complex molecular chains, which constitute the product's aromas, characterized in that said filter also comprises an oxygen and/or carbon dioxide adsorbent able to remove the residual oxygen in the container.

3. A valve according to claim 2, wherein said selective filtering layer and said oxygen and carbon dioxide adsorbent layer are overlapping and interposed between disks of porous material.

4. A valve according to claim 2, wherein said oxygen and carbon dioxide adsorbent layer is disposed innermost in the container and therefore nearest the product.

5. A valve according to claim 2, wherein said oxygen and carbon dioxide adsorbent is incorporated in said selective filtering layer, constituting a single layer enclosed between two porous disks.

6. A valve according to claim 2, wherein said selective filtering layer and said oxygen and carbon dioxide adsorbent layer are disposed alongside and separated from each other.

7. A valve according to claim 6, wherein said oxygen and carbon dioxide adsorbing layer is not in communication with the outside of the container.

8. A valve according to claim 2, wherein said oxygen and carbon dioxide adsorbent layer comprises materials containing ferrous ions.

9. A valve according to claim 2, wherein said selective filtering layer consists of activated charcoal.

10. A valve according to claim 2, wherein said selective filtering layer and said oxygen and carbon dioxide adsorbent layer are contained in a seating formed in said valve body.

11. A valve according to claim 2, wherein said valve body comprises a base plate housing said filter and an opposing cap provided with respective holes and said valve element is a rubber diaphragm normally pressed against the plate so as to close said holes.

12. A degassing valve according to claim 2, wherein said valve is applied to a wall of a container for aromatic products.

13. A valve according to claim 12, wherein said valve is protected by an underlying impermeable layer before application to the container.

14. A valve according to claim 13, wherein said impermeable layer consists of a peel-away film that is removed when the valve is applied to the container.

15. A valve according to claim 13, wherein said impermeable layer consists of a film that is perforated at the time of application of the valve to the package.

16. A valve according to claim 3, wherein said oxygen and carbon dioxide adsorbent layer is disposed innermost in the container and therefore nearest the product.

17. A valve according to claim 3, wherein said oxygen and carbon dioxide adsorbent layer comprises materials containing ferrous ions.

18. A valve according to claim 3, wherein said selective filtering layer consists of activated charcoal.

19. A valve according to claim 3, wherein said selective filtering layer and said oxygen and carbon dioxide adsorbent layer are contained in a seating formed in said valve body.

20. A degassing valve according to claim 3, wherein said valve is applied to a wall of a container for aromatic products.

* * * * *

UNITED STATES PATENT AND TRADEMARK OFFICE
CERTIFICATE OF CORRECTION

PATENT NO.     : 6,468,332 B2                                              Page 1 of 1
DATED          : October 22, 2002
INVENTOR(S)    : Franco Goglio et al.

It is certified that error appears in the above-identified patent and that said Letters Patent is hereby corrected as shown below:

<u>Title page,</u>
Item [22], should read
-- [22]  Filed:  May 21, 2001 --

Signed and Sealed this

Eighth Day of April, 2003

JAMES E. ROGAN
*Director of the United States Patent and Trademark Office*